United States Patent
Hong et al.

(10) Patent No.: US 12,224,914 B2
(45) Date of Patent: Feb. 11, 2025

(54) METHOD, APPARATUS, AND DEVICE FOR DATA ANALYTICS AND STORAGE MEDIUM

(71) Applicant: ZTE CORPORATION, Guangdong (CN)

(72) Inventors: Yingjie Hong, Guangdong (CN); Liang Wang, Guangdong (CN); Liya Yuan, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/642,157

(22) PCT Filed: Aug. 4, 2020

(86) PCT No.: PCT/CN2020/106792
§ 371 (c)(1),
(2) Date: Mar. 10, 2022

(87) PCT Pub. No.: WO2021/047332
PCT Pub. Date: Mar. 18, 2021

(65) Prior Publication Data
US 2022/0329493 A1 Oct. 13, 2022

(30) Foreign Application Priority Data
Sep. 11, 2019 (CN) .......................... 201910860091.9

(51) Int. Cl.
*H04L 29/08* (2006.01)
*H04L 41/14* (2022.01)
*H04L 41/16* (2022.01)

(52) U.S. Cl.
CPC ............ *H04L 41/145* (2013.01); *H04L 41/16* (2013.01)

(58) Field of Classification Search
CPC .............................. H04L 41/145; H04L 41/16
See application file for complete search history.

(56) References Cited

U.S. PATENT DOCUMENTS

| 11,252,583 B2 * | 2/2022 | Sun ....................... H04M 15/66 |
| 2017/0289226 A1 * | 10/2017 | Deshpande ...... H04N 21/25866 |

(Continued)

FOREIGN PATENT DOCUMENTS

| CN | 102571400 A | 7/2012 |
| CN | 109474450 A | 3/2019 |

(Continued)

OTHER PUBLICATIONS

WIPO, International Search Report dated Sep. 28, 2020.

(Continued)

*Primary Examiner* — Adnan M Mirza
(74) *Attorney, Agent, or Firm* — Li & Cai Intellectual Property (USA) Office

(57) ABSTRACT

There are provided a method, an apparatus and a device for data analytics, and a storage medium. The method includes: determining analytics data according to a data analytics request, where the data analytics request includes a first data analytics request or a second data analytics request (S101); determining an analytics model according to the data analytics request (S102); and obtaining a data analytics result according to the analytics data and the analytics model (S103).

18 Claims, 5 Drawing Sheets

(56) References Cited

U.S. PATENT DOCUMENTS

| | | | |
|---|---|---|---|
| 2019/0014153 A1 | 1/2019 | Lang et al. | |
| 2019/0213893 A1* | 7/2019 | Roy | G08G 5/0026 |
| 2020/0213876 A1 | 7/2020 | Sun et al. | |
| 2020/0228413 A1 | 7/2020 | Chong et al. | |
| 2020/0228999 A1 | 7/2020 | Chong et al. | |
| 2020/0364571 A1 | 11/2020 | Xu et al. | |
| 2020/0366567 A1 | 11/2020 | Li et al. | |
| 2020/0374742 A1 | 11/2020 | Chong et al. | |
| 2021/0083956 A1* | 3/2021 | Fan | H04L 43/0876 |
| 2021/0377097 A1 | 12/2021 | Wang | |

FOREIGN PATENT DOCUMENTS

| | | | |
|---|---|---|---|
| CN | 109600241 A | 4/2019 | |
| CN | 109600243 A | 4/2019 | |
| CN | 110072273 A | 7/2019 | |
| CN | 110119808 A | 8/2019 | |
| CN | 110120879 A | 8/2019 | |
| CN | 110166377 A | 8/2019 | |
| CN | 110569288 A | 12/2019 | |
| WO | WO2019047913 A1 | 3/2019 | |

OTHER PUBLICATIONS

European Patent Office, the extended European Search Report dated Aug. 4, 2023, for corresponding EP application No. 20862431.2.

Korean Patent Office, First Office Action dated Jul. 15, 2024, for corresponding KR application No. 10-2022-7008691.

China Patent Office, First Office Action dated Aug. 30, 2024, for corresponding CN application No. 201910860091.9.

Orange, Huawei, "Clarifications to Observed Service experience related network data analysis", 3GPP TSG-SA2 Meeting#137, Jun. 18, 2019.

* cited by examiner

METHOD, APPARATUS, AND DEVICE FOR DATA ANALYTICS AND STORAGE MEDIUM

The present application claims priority from the Chinese patent application No. 201910860091.9 filed with the China Patent Office on Sep. 11, 2019, the entire contents of which are incorporated in the present application by reference.

TECHNICAL FIELD

The present application relates to a wireless communication network, and for example, relates to a method, an apparatus, and a device for data analytics, and a storage medium.

BACKGROUND

Network Data Analytics Function (NWDAF) is capable of collecting data from Operations Administration and Maintenance (OAM), an application function (AF), or a Network Function (NF). Based on above data collection, the NWDAF performs data analytics and provides an analytics result to the AF, NF, or OAM. However, there is no effective way for the NWDAF to select a desired artificial intelligence (AI) model from a large number of AI models.

SUMMARY

The present application provides a method, an apparatus, and a device for data analytics, and a storage medium, which can select a desired model from a large number of AI models for data analytics.

An embodiment of the present application provides a data analytics method, including:
  determining analytics data according to a data analytics request, where the data analytics request includes a first data analytics request or a second data analytics request;
  determining an analytics model according to the data analytics request; and
  obtaining a data analytics result according to the analytics data and the analytics model.

In an implementation, the first data analytics request includes at least one of: a data analytics service type, a model identifier, or an analytics result policy, and the second data analytics request includes at least one of: a data analytics service type, data to be analyzed, a model identifier, or an analytics result policy.

In an implementation, the determining analytics data according to the data analytics request includes at least one of:
  acquiring, according to the data analytics service type in the first data analytics request, the analytics data from a 3rd Generation Partnership Project (3GPP) network; or
  determining the data to be analyzed carried in the second data analytics request as the analytics data.

In an implementation, the analytics result policy is a requirement to be satisfied by a model analytics result, and includes at least one of: an accuracy of analytics result, or a return time length of analytics result. The data analytics service type is a data analytics service capability identifier defined by the NWDAF, and includes at least one of: service experience, or a load level, and the model identifier is identifier information of a model to be used in a data analytics service.

In an implementation, the method further includes:
  receiving the data analytics request sent from a model consumer or a service consumer.

In an implementation, the acquiring analytics data according to a data analytics request includes:
  acquiring, according to the data analytics service type and/or an analytics target, analytics data from an NF and/or AF and/or OAM of a 3rd Generation Partnership Project (3GPP) network.

In an implementation, the data analytics request further includes a data analytics result receiver, and accordingly, the method further includes:
  sending the data analytics result to the data analytics result receiver.

In an implementation, the method further includes:
  sending the analytics data to a big data platform for storage.

In an implementation, the determining an analytics model according to the data analytics request includes at least one of:
  a first mode, determining a desired model and/or model type according to the data analytics service type and/or the model identifier, and determining a local model, which is the same as the desired model and/or has a type the same as the desired model type, as the analytics model;
  a second mode, determining a desired local model according to the data analytics service type and/or the model identifier, and training the desired local model to obtain the analytics model; or
  a third mode, generating a model request according to the data analytics service type and/or the model identifier, sending the model request to a model owner, and receiving an analytics model fed back from the model owner, where the model owner is an artificial intelligence (AI) platform or a 3GPP network function having a model; and the analytics model is determined by the model owner according to the model request.

In an implementation, the obtaining a data analytics result according to the analytics data and the analytics model includes:
  running the analytics model to analyze the analytics data to obtain the data analytics result.

In an implementation, in response to that the data analytics result fails to satisfy the analytics result policy, a new analytics model is determined; and
  the new analytics model is run to analyze the analytics data to obtain a new data analytics result.

In an implementation, determining the new analytics model includes at least one of:
  a first mode, training the analytics model to obtain the new analytics model; or
  a second mode, sending a new model request to a model owner, and receiving the new analytics model fed back from the model owner.

In an implementation, after obtaining the analytics model, the method further includes:
  generating model information and/or model running instance information, the model information includes at least one of: a model version, a model catalog, a model identifier or model association information, and the model running instance information includes at least one of: a model running status, a model running timestamp, a number of model callings, or model accuracy.

In an implementation, the model information and/or the model running instance information are sent to a Network Repository Function (NRF).

In an implementation, the model request includes at least one of: a model receiver address, a model type identifier, a model identifier, training data, a model screening condition, model data association information, or a model feedback policy.

In an implementation, the model screening condition includes at least one of: a model running environment, model performance or model accuracy; and the model feedback policy includes at least one of: a number of models to be fed back each time, or a preset time duration for feeding back models. The model data association information is configured for generating or training data information to be input into the model, and the model data association information includes at least one of: data contents, or a data location. The model type identifier is configured to identify the desired model type.

In an implementation, the model owner obtains the analytics model according to the model request by at least one of:
 determining, by the model owner, a model satisfying the model type identifier and/or the model identifier and/or the model screening condition as the analytics model;
 determining, by the model owner, a model satisfying the model type identifier and/or the model identifier and/or the model screening condition as the desired model, and training, by the model owner, the desired model according to the training data and/or the model data association information to obtain the analytics model; or
 forwarding, by the model owner, the model request to a third-party model owner, and receiving the analytics model from the third-party model owner.

In an implementation, the model owner obtains the analytics model according to the model request further by:
 feeding, by the model owner, the analytics model back to a model receiver according to the model feedback policy, where the model receiver is determined by the model receiver address.

In an implementation, the model owner may feed back a model identifier, and the model consumer calls a model through the model identifier.

In an implementation, the method further includes:
 generating a data result request and sending the data result request to a model owner; the data result request including at least one or more of: an analytics result receiver address, a model type identifier, a model identifier, the analytics data, or the analytics result policy; and
 receiving a data analytics result fed back from the model owner, where the data analytics result is determined by the model owner according to the data result request.

In an implementation, the model owner obtains the data analytics result according to the data result request by at least one of:
 a first mode, determining, by the model owner, an analytics model according to the model type identifier and/or the model identifier, and running the analytics model to analyze the analytics data to obtain the data analytics result;
 a second mode, determining, by the model owner, an analytics model according to the model type identifier and/or the model identifier, and training, by the model owner, the analytics model using the analytics data to obtain a new analytics model; running the new analytics model to analyze the analytics data to obtain a new data analytics result, judging whether the new data analytics result satisfies the analytics result policy, and returning, in response to that the new data analytics result fails to satisfy the analytics result policy, to execute the training the analytics model using the analytics data to obtain a new analytics model, until the data analytics result satisfies the analytics result policy; or
 a third mode, acquiring, by the model owner, an analytics model from a third-party model owner according to the model type identifier and/or the model identifier, and running the analytics model to analyze the analytics data to obtain the data analytics result.

In an implementation, the model owner obtains the data analytics result according to the data result request further by:
 feeding, by the model owner, the data analytics result back to an analytics result receiver, where the analytics result receiver is determined by the analytics result receiver address.

In an implementation, the method further includes:
 receiving NWDAF configuration information; where the configuration information includes at least one of: a model owner address, or a model auxiliary parameter; and
 configuring a target model according to the NWDAF configuration information.

In an implementation, the target model is configured according to the NWDAF configuration information by at least one of:
 a first mode, training according to the model auxiliary parameter to obtain the target model; or
 a second mode, generating a model request and sending the model request to a model owner, and receiving a target model fed back from the model owner, the target model is determined by the model owner according to the model request.

In an implementation, the model request includes at least one of: a model receiver address, a model type identifier, a model identifier, training data, a model screening condition, model data association information, or a model feedback policy.

In an implementation, the model screening condition includes at least one of: a model running environment, model performance or model accuracy; and the model feedback policy includes at least one of: a number of models to be fed back each time, or a preset time duration for feeding back models.

In an implementation, the model owner may feed back a model identifier.

In an implementation, the method further includes:
 sending a service capability folder to a Network Repository Function (NRF), the service capability folder includes model information locally supported.

In an implementation, the method further includes:
 receiving a model query request, the model query request is configured to query model information and/or model running instance information, where the model query request includes at least one of: a query result receiver, or a query screening condition; and the query screening condition includes at least one of: a query object, a query time range, or query contents; and
 sending a model query result to the query result receiver according to the model query request.

An embodiment of the present application further provides a data analytics apparatus, including:
 an analytics data acquisition module configured to determine analytics data according to a data analytics request, where the data analytics request includes a first data analytics request or a second data analytics request;

an analytics model determination module configured to determine an analytics model according to the data analytics request; and an analytics result determination module configured to obtain a data analytics result according to the analytics data and the analytics model.

In an implementation, the first data analytics request includes at least one of: a data analytics service type, a model identifier, or an analytics result policy, and the second data analytics request includes at least one of: a data analytics service type, data to be analyzed, a model identifier, or an analytics result policy.

In an implementation, the analytics data acquisition module is configured to determine the analytics data by at least one of:

acquiring, according to the data analytics service type in the first data analytics request, the analytics data from a 3rd Generation Partnership Project (3GPP) network; or determining the data to be analyzed carried in the second data analytics request as the analytics data.

In an implementation, the apparatus further includes:

a sending module configured to send the analytics data to a big data platform for storage.

In an implementation, the analytics model determination module is configured to determine the analytics model by one of:

determining a desired model and/or model type according to the data analytics service type and/or the model identifier, and determining a local model, which is the same as the desired model and/or has a type the same as the desired model type, as the analytics model;

determining a desired local model according to the data analytics service type and/or the model identifier, and training the desired local model to obtain the analytics model; or generating a model request according to the data analytics service type and/or the model identifier, sending the model request to a model owner, and receiving an analytics model fed back from the model owner, the model owner is an AI platform or a 3GPP network function having a model; and the analytics model is determined by the model owner according to the model request.

In an implementation, the analytics result determination module is configured to run the analytics model to analyze the analytics data to obtain the data analytics result.

In an implementation, the analytics model determination module is further configured to determine a new analytics model in response to that the data analytics result fails to satisfy the analytics result policy; and run the new analytics model to analyze the analytics data to obtain a new data analytics result.

In an implementation, the analytics model determination module is configured to determine the new analytics model by one of:

training the analytics model to obtain a new analytics model; or sending a new model request to a model owner, and receiving the new analytics model fed back from the model owner.

In an implementation, the model request includes at least one of: a model receiver address, a model type identifier, a model identifier, training data, a model screening condition, model data association information, or a model feedback policy.

In an implementation, the apparatus further includes:

an information generation module configured to generate, after obtaining the analytics model, model information and/or model running instance information, the model information includes at least one of: a model version, a model catalog, a model identifier or model association information, and the model running instance includes at least one of: a model running status, a model running timestamp, a number of model callings, or model accuracy.

In an implementation, the sending module is further configured to send the model information and/or the model running instance information to a Network Repository Function (NRF).

In an implementation, the model owner obtains the analytics model according to the model request by at least one of:

determining, by the model owner, a model satisfying the model type identifier and/or the model identifier and/or the model screening condition as the analytics model;

determining, by the model owner, a model satisfying the model type identifier and/or the model identifier and/or the model screening condition as the desired model, and training, by the model owner, the desired model according to the training data and/or the model data association information to obtain the analytics model; or forwarding, by the model owner, the model request to a third-party model owner, and receiving the analytics model from the third-party model owner.

In an implementation, the model owner feeds the analytics model back to a model receiver according to the model feedback policy, the model receiver is determined by the model receiver address.

In an implementation, the information generation module is further configured to generate a data result request and send the data result request to a model owner; and the data result request includes at least one of: an analytics result receiver address, a model type identifier, a model identifier, the analytics data, or the analytics result policy.

In an implementation, the apparatus further includes:

a receiving module configured to receive a data analytics result fed back from the model owner, the data analytics result is determined by the model owner according to the data result request.

In an implementation, the model owner obtains the data analytics result according to the data result request by at least one of:

determining, by the model owner, an analytics model according to the model type identifier and/or the model identifier, and running the analytics model to analyze the analytics data to obtain the data analytics result; or training, by the model owner, an analytics model using the analytics data to obtain a new analytics model, and running the new analytics model to analyze the analytics data to obtain the data analytics result.

In an implementation, it is judged whether the data analytics result satisfies the analytics result policy, and in response to that the new data analytics result fails to satisfy the analytics result policy, it returns to execute the training the analytics model using the analytics data to obtain a new analytics model, until the data analytics result satisfies the analytics result policy; or the model owner acquires an analytics model from a third-party model owner according to the model type identifier and/or the model identifier, and runs the analytics model to analyze the analytics data to obtain the data analytics result.

In an implementation, the model owner feeds the data analytics result back to an analytics result receiver, the analytics result receiver is determined by the analytics result receiver address.

In an implementation, the receiving module is further configured to receive NWDAF configuration information, the configuration information includes at least one of: a model owner address, or a model auxiliary parameter.

In an implementation, a configuration module is configured to configure a target model according to the NWDAF configuration information.

In an implementation, the configuration module is configured to configure a target model by one of:
training according to the model auxiliary parameter to obtain the target model; or
generating a model request and sending the model request to a model owner, and receiving a target model fed back from the model owner, the target model is determined by the model owner according to the model request.

In an implementation, the receiving module is further configured to receive a model query request, the model query request is configured to query model information and/or model running instance information, the model query request includes at least one of: a query result receiver, or a query screening condition; and the query screening condition includes at least one of: a query object, a query time range, or query contents.
the sending module is further configured to send a model query result to the query result receiver according to the model query request.

An embodiment of the present application further provides an electronic device, including:
one or more processors;
a memory storing therein one or more programs, where the one or more programs, when executed by the one or more processors, cause the one or more processors to implement the data analytics method according to the above embodiment.

An embodiment of the present application further provides a storage medium having a computer program stored therein, the computer program, when executed by a processor, causes the data analytics method according to the above embodiment to be implemented.

DETAIL DESCRIPTION OF EMBODIMENTS

Embodiments of the present application will be described below with reference to the accompanying drawings.

The operations illustrated in the flowchart of the drawings may be executed in a computer system such as a set of computer-executable instructions. Although a logical order is shown in the flowchart, in some cases, the operations shown or described may be performed in a different order than illustrated herein.

Figure 1:
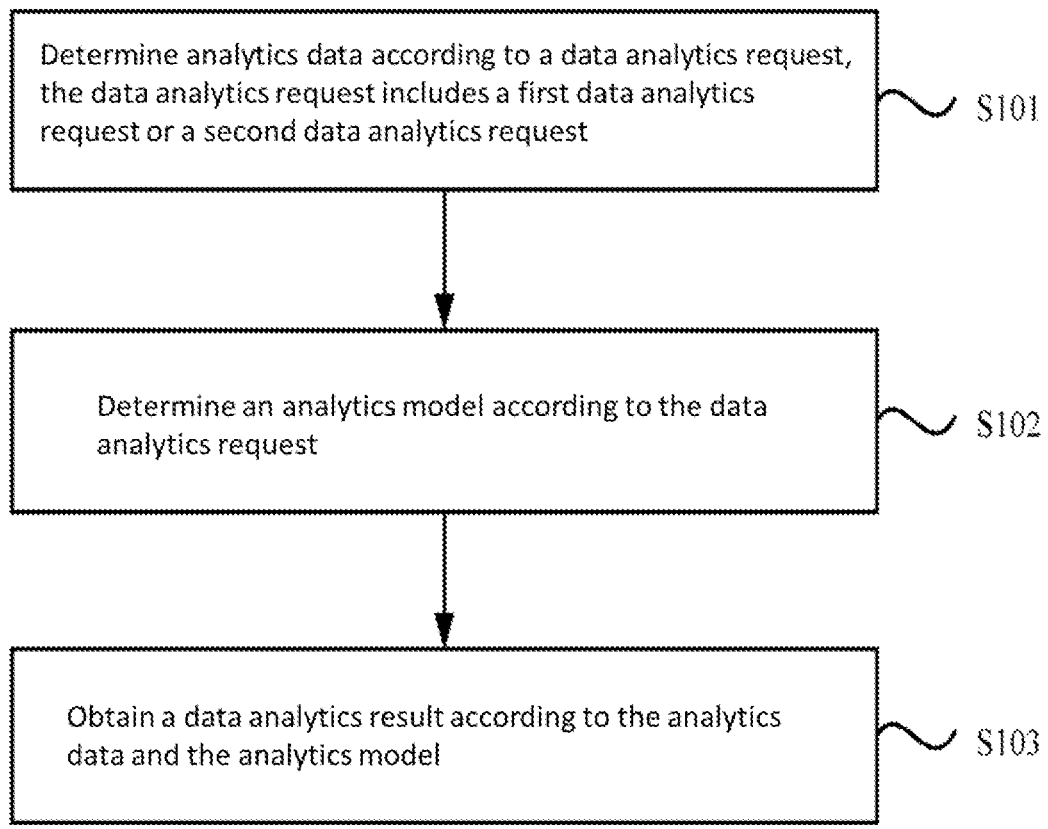
FIG. 1 is a schematic flowchart of a data analytics method provided in the present application.

FIG. 1 is a schematic flowchart of a data analytics method provided in the present application. The method may be applied to a scenario of selecting a desired AI model in a 3GPP network for data analytics. The method may be performed by a data analytics apparatus provided in the present application, and the data analytics apparatus may be implemented by software and/or hardware.

Figure 2:
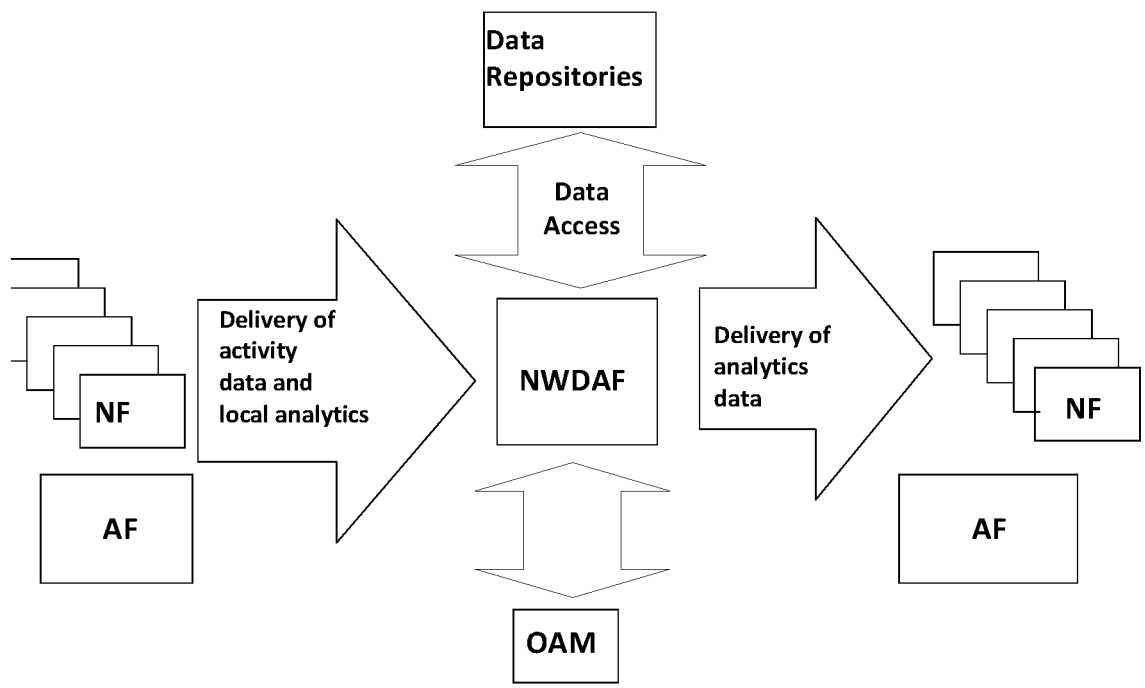
FIG. 2 is a schematic structural diagram of an overall framework for 3GPP network automation provided in the present application.

FIG. 2 is a schematic structural diagram of an overall framework for 3GPP network automation provided in the present application. As shown in FIG. 2, the NWDAF may collect data from OAM, AF and 3GPP network functions of an operator. For collection of data from OAM, the NWDAF may reuse a mechanism or interface defined by 3GPP. The AF may perform information interaction with the NWDAF through a Network Exposure Function (NEF) according to a network deployment, or directly access the NWDAF via a service-based interface. The NWDAF may access network data from a data repository, such as a Unified Data Repository (UDR). For a 3GPP NF, the NWDAF acquires network data through communication via an interface based on a 3GPP-defined service. Based on above data collection, the NWDAF performs data analytics and provides a data analytics result to the 3GPP NF, AF or OAM.

The NF in 3GPP (i.e., 3GPP NF) includes, but is not limited to, various network function types as listed below.

An Access Management Function (AMF) is a common control plane function in a core network, terminates non-access-stratum (NAS) messages between any user and the network, and implements user mobility management, user equipment (UE) status (e.g., reachability) management, or the like.

A Session Management Function (SMF) implements session establishment, modification or deletion, and controls charging and policy execution of Policy Control Function (PCF), or the like.

The PCF makes a policy, including a routing policy, a service quality policy, a charging policy or the like, for a terminal according to user subscription, a current position of UE and information related to an application.

Unified Data Management (UDM) implements unified management of data, permanent storage of user subscription data, or other functions; and the UDR is configured to store user subscription data, policy data, or the like managed by the UDM and the PCF.

A User Plane Function (UPF) is a function of a user plane in a core network, serves as an anchor point of the user plane in the core network, as well as an interface for data transmission with an external Data Network (DN), and executes part of PCF policy and rules on the user plane, or the like.

The NEF is configured to expose capabilities and events of a 3GPP NF to another NF or AF of an external application, provide AF-preconfigured capabilities of the 3GPP NF, and implement information mapping between a 3GPP network and an external network, or the like.

The AF refers to an application accessed in 3GPP.

The NRF maintains an NF folder (including an NF entity and description of services to be supported), supports a service discovery function, or the like.

The NWDAF supports data collection from an NF, AF, or OAM, exposes service registration and metadata to the NF and/or AF, and exposes analytics result to the NF and/or AF and/or OAM.

The OAM may be an OAM in a core network, and/or an OAM of a radio access network (RAN).

Figure 3:
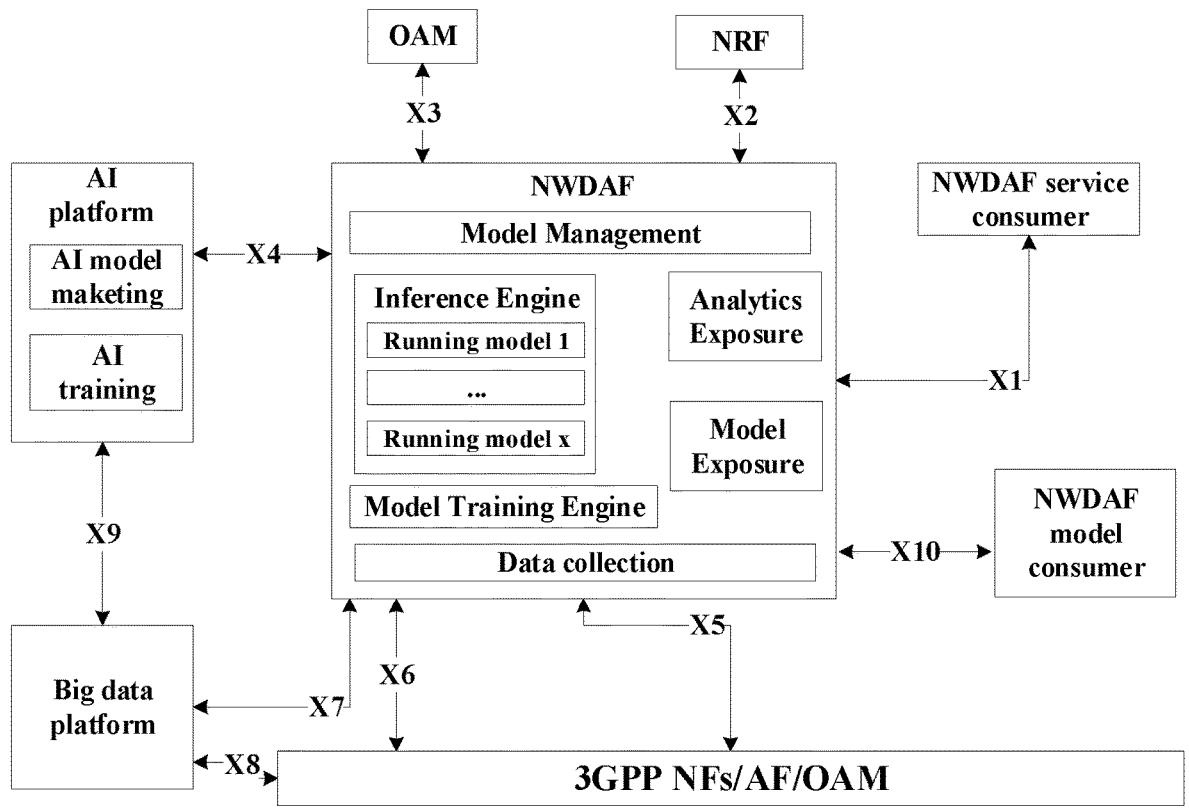
FIG. 3 is a schematic structural diagram of a 3GPP network deployment and management AI model provided in the present application.

FIG. 3 is a schematic structural diagram of a 3GPP network deployment and management AI model provided in the present application. As shown in FIG. 3, an AI platform is a logical function platform for managing AI models, and may include functions such as AI model marketing, AI model training, or the like. The AI model marketing may include functions such as model on-boarding, storage, release, discovery, selection, deployment, or the like, and the AI model training includes training and updating AI model capabilities for the AI platform. The function of the AI platform may be a function provided by a third party, or may be deployed in one or more 3GPP network functions. The AI platform provides an AI model or an analytics result to the NWDAF via an X4 interface.

A big data platform has a capability of acquiring and/or storing 3GPP network data, and provides data to the AI Platform for model training and analytics. The big data platform acquires data from a 3GPP network via an X8 interface, or acquires data from the NWDAF via an X7 interface.

A capability of the NWDAF includes at least one of:
data collection, which refers to a capability of acquiring data from various 3GPP network functions NF, OAM, or AF;
analytics function exposure, which refers to a capability of the NWDAF exposing its own service capability to an NWDAF service consumer;
AI Model Management, which means that the NWDAF may have a capability including at least one of:
  AI model management: including the ability of acquiring, storing, deleting/updating AI model information locally stored at the NWDAF, the AI model information may include at least one of the following parameters: an AI model catalog, an AI model file, or AI model related parameter information (such as model parameter input/output methods, or the like); or
  AI model instance management: including at least one of the following parameters: model lifecycle management, running status monitoring (such as a model running state or a model stopped state, a number of model callings, accuracy/precision), or the like;
AI Model Exposure, which refers to a capability of exposing a model to another model consumer;
AI Inference Engine, which refers to a capability of desired software and/or hardware for running an AI model; or
AI Training Engine, which refers to a capability of desired software and/or hardware for training an AI model.

The model consumer may be regarded as a 3GPP NF/AF/OAM. For example, the model consumer may be an NWDAF in which the desired model is not deployed but an AI model may be acquired via an X10 interface to the NWDAF; or the model consumer may be an NWDAF which does not support running model inference but an analytics result may be obtained by sending collected data to the NWDAF via an X10 interface.

The X1 interface is an interface between an NWDAF service consumer (e.g., 3GPP NF, AF or OAM) and the NWDAF.

The X2 interface is an interface between the NWDAF and the NRF, through which the NWDAF capability may be exposed to the NRF.

The X3 interface is an interface between the NWDAF and the OAM, which may be configured to implement function configuration and deployment of the NWDAF.

The X4 interface is an interface between the NWDAF and the AI platform, which may be configured to implement acquisition and updating of the AI model and the model analytics result, for example, the NWDAF sends a model acquisition request or a model analytics result request, in which at least one of the following parameters may be contained:
  an AI model receiving address: a deployment address of the requested AI model;
  training data: data provided from the NWDAF to the AI platform for AI model training, including the collected data and/or an analytics result thereof;
  an AI model identifier: an identifier of the desired AI model;
  an AI model type identifier: an identifier of type of the desired AI model;
  model screening condition: various conditions (e.g., running environment requirements, performance, accuracy, etc.) to be satisfied by the AI model;
  model data association information: information of data to be input for generating or training an AI model, including contents, locations of data input, or the like); or
  an analytics result policy: how many analytics results to be returned each time, for example.

The X5 interface is an interface between the NWDAF and the 3GPP network function NF, AF or OAM, and the NWDAF may acquire desired network data from the above 3GPP network function through such interface.

The X6 interface is an interface between the NWDAF and the 3GPP network function NF, AF or OAM, and the NWDAF may expose its own data (e.g., model instance management data) to the 3GPP network function NF, AF or OAM, or the like through such interface.

The X7 interface is an interface between the NWDAF and a big data platform, and the NWDAF may send the collected network data and model instance management data to the big data platform through such interface.

The X8 interface is an interface between a big data platform and a 3GPP network, and 3GPP network data may be acquired through such interface.

The X9 interface is an interface between a big data platform and an AI platform, and through such interface, network data is transferred and used for implementing operations such as model training and updating on the AI platform.

The X10 interface is an interface between a model consumer and the NWDAF, and through such interface, the model consumer may make a model application or obtain an analytics result.

Through a combination of the above logical functions and interfaces, the NWDAF may have different data analytics service capabilities, such as service experience, load level, or the like.

As shown in FIG. 1, the data analytics method provided in the present application includes S101, S102, and S103.

At S101, determining analytics data according to a data analytics request, where the data analytics request includes a first data analytics request or a second data analytics request.

In an implementation, a data analytics consumer sends a data analytics request to the NWDAF so that the NWDAF determines analytics data and an analytics model according to the data analytics request. The data analytics consumer sends the data analytics request to the NWDAF via an X1 interface (see FIG. 3).

The first data analytics request includes at least one of: a data analytics service type, a model identifier, or an analytics result policy, and the second data analytics request includes at least one of: a data analytics service type, data to be analyzed, a model identifier, or an analytics result policy.

The determining analytics data according to the data analytics request includes at least one at least one of:
acquiring, according to the data analytics service type in the first data analytics request, the analytics data from a 3rd Generation Partnership Project (3GPP) network; or
determining the data to be analyzed carried in the second data analytics request as the analytics data.

The analytics result policy is a requirement to be satisfied by the model analytics result, and includes at least one of: analytics result accuracy, or a return time length of analytics result. The data analytics service type is a data analytics service capability identifier defined by the NWDAF, and includes at least one of: service experience, or a load level, and the model identifier is identifier information of the model to be used in a data analytics service. Exemplarily, the data analytics service type may be volume of commuters in a shopping mall, an attendance of a cinema, a customer group of a product, or the like.

In an example, the acquiring analytics data according to the data analytics request includes: acquiring, according to the data analytics service type, analytics data from an NF and/or AF and/or OAM of a 3rd Generation Partnership Project (3GPP) network.

In an implementation, the NWDAF determines, according to the data analytics service type of the data analytics request, to acquire desired analytics data from which one of the 3GPP network functions NF and/or AF and/or OAM, and acquires the desired analytics data from the 3GPP network functions NF and/or AF and/or OAM via an X5 interface (see FIG. 3).

In an implementation, the analytics data is sent to a big data platform for storage. The NWDAF stores the acquired analytics data in the big data platform via an X7 interface (see FIG. 3). The big data platform is configured to store 3GPP network data, and provide the stored data to a model owner for model training.

At S102, determining an analytics model according to the data analytics request.

In an implementation, the determining an analytics model according to the data analytics request includes at least one of:
a first mode, determining a desired model and/or model type according to the data analytics service type and/or the model identifier, and determining a local model, which is the same as the desired model and/or has a type the same as the desired model type, as the analytics model;
a second mode, determining a desired local model according to the data analytics service type and/or the model identifier, and training the desired local model to obtain the analytics model; or
a third mode, generating a model request according to the data analytics service type and/or the model identifier, sending the model request to a model owner, and receiving an analytics model fed back from the model owner, the model owner is an AI platform or a 3GPP network function having a model; and the analytics model is determined by the model owner according to the model request.

In an example, the desired model is acquired locally from the NWDAF, and the desired model and/or model type is determined according to the data analytics service type and/or the model identifier. A search is performed for local models of the NWDAF, and a local model, which is the same as the desired model and/or has a type the same as the desired model type, is determined as the analytics model.

In an example, after receiving a data analytics request sent from a service consumer, the desired local model is determined according to the data analytics service type and/or the model identifier, and trained to obtain the analytics model.

In an example, the NWDAF sends a model request to a model owner, and obtains an analytics model and/or model identifier and/or model association information fed back from the model owner. The model owner represents a functional module owning the model, may be a 3GPP network function or a functional module provided by a third party. The model request includes at least one of: a model receiver address, a model type identifier, a model identifier, training data, a model screening condition, model data association information, or a model feedback policy. Table 1 is a table of parameters and descriptions thereof contained in the model request provided in the present application.

TABLE 1

| Parameter(s) | Description |
| --- | --- |
| Model receiver address | An address for receiving the model |
| Model type identifier | An identifier of the desired model type |
| Model identifier | An identifier of the desired model |
| Training data | Data provided to a model owner for model training, such as data collected in real time and/or analytics results thereof |
| Model screening conditions | Various conditions (e.g., running environment, performance, accuracy, etc.) to be satisfied by a model |
| Model data association information | Information of historical data to be input for model generation or training, such as data contents, locations, or the like |
| Model feedback policy | Requirements to be satisfied for returning results, e.g., a number of models to be returned each time, a time limit for returning results, or the like |

The model receiver address is configured to indicate an address from which a model request is sent, and also refers to an address to which the analytics model is fed back.

In an example, the model owner obtains the analytics model according to the model request by at least one of:
a first mode, determining, by the model owner, a model satisfying the model type identifier and/or the model identifier and/or the model screening condition as the analytics model;

a second mode, determining, by the model owner, a model satisfying the model type identifier and/or the model identifier and/or the model screening condition as the desired model, and training, by the model owner, the desired model according to the training data and/or the model data association information to obtain the analytics model; or a third mode, forwarding, by the model owner, the model request to a third-party model owner, and receiving an analytics model from the third-party model owner.

Figure 4:
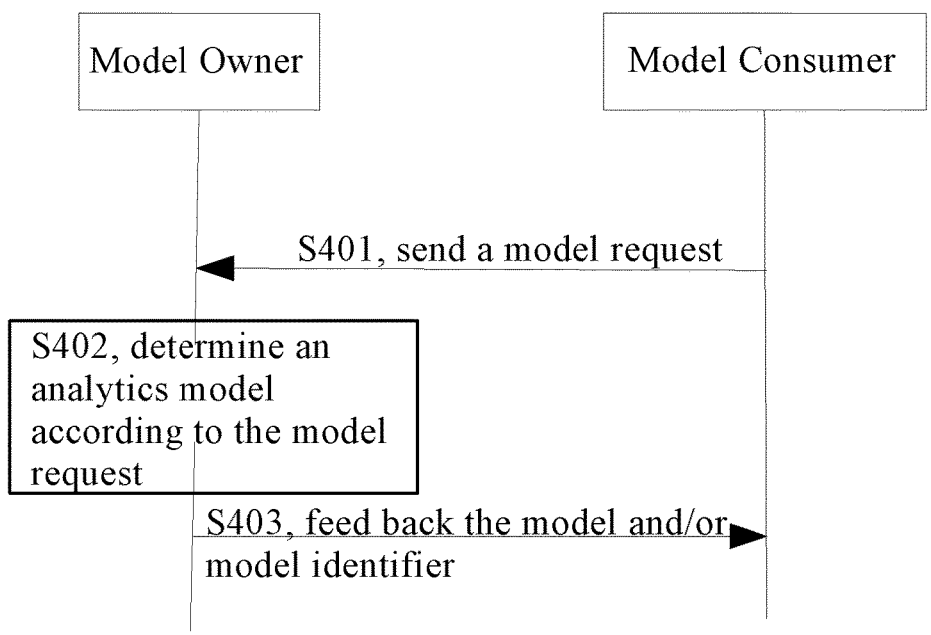
FIG. 4 is a flowchart of a model request method provided in the present application.

FIG. 4 is a flowchart of a model request method provided in the present application. As shown in FIG. 4, the model owner represents a logical function having a model, and may further include capabilities including model training, model generation, model management, and historical data for model training (e.g., a big data platform), and the model owner may also be indicated as an AI platform or an NWDAF having a model. The model consumer represents a logic function expecting to obtain a model, may be a function such as 3GPP network functions NF and/or AF and/or OAM, or other functions, or may be an NWDAF without any model. In an implementation, the model consumer is an NWDAF without any model. The model consumer sends a model request to the model owner to acquire the analytics model fed back from the model owner. The model request method includes S401, S402, and S403.

At S401, sending, by a model consumer, a model request message carrying any one or more parameters listed in table 1 to a model owner.

At S402, determining an analytics model according to the model request.

A desired model is determined, according to information such as a model type identifier and/or a model identifier and/or a screening condition, as the analytics model.

If the model owner does not have a model that satisfies the model request, the model owner may train the desired model, by using data acquired according to model data association information, or training data input, as the analytics model.

If the model owner does not have a model that satisfies the model request, the model owner may also forward the model request to a third-party model owner, and receive an analytics model fed back from the third-party model owner.

At S403, feeding back, by the model owner, the model and/or model identifier.

The model owner feeds back the analytics model to a model receiver according to a model feedback policy, the model receiver being determined by the model receiver address. The model identifier is a unique identifier of the model.

At S103, obtaining a data analytics result according to the analytics data and the analytics model.

In an example, the analytics model is run to analyze the analytics data to obtain the data analytics result.

The obtained data analytics result is compared with the analytics result policy, and if the data analytics result satisfies the analytics result policy, the data analytics result is directly fed back to the service consumer via an X1 interface (see FIG. 3).

If the data analytics result fails to satisfy the analytics result policy, a new analytics model is determined and run to analyze the analytics data to obtain a new data analytics result.

Determining the new analytics model includes one of:
a first mode, training the analytics model to obtain the new analytics model; or
a second mode, sending a new model request to a model owner, and receiving the new analytics model fed back from the model owner.

In an example, the analytics model is run to analyze the analytics data to obtain the data analytics result. If the data analytics result fails to satisfy the analytics result policy, the analytics model is trained by using the analytics data to obtain a new analytics model. The new analytics model is run to analyze the analytics data to obtain a new data analytics result, which is then compared with the analytics result policy. If the new data analytics result fails to satisfy the analytics result policy, the operation of training the analytics model by using the analytics data to obtain a new analytics model is repeated, until the data analytics result satisfies the analytics result policy.

In an example, the analytics model is run to analyze the analytics data to obtain the data analytics result. If the data analytics result fails to satisfy the analytics result policy, a new model request is re-generated and sent to a model owner, and a new analytics model fed back from the model owner is received. The new analytics model is run to analyze the analytics data to obtain a new data analytics result, which is then compared with the analytics result policy. If the new data analytics result fails to satisfy the analytics result policy, the operations of re-generating a new model request and sending the new model request to the model owner, and receiving a new analytics model fed back from the model owner are repeated, until the data analytics result satisfies the analytics result policy.

The method for the model owner obtaining the new analytics model according to the new model request is the same as the method for the model owner obtaining the analytics model according to the model request described above, and for the specific implementation process of the method for the model owner obtaining the new analytics model according to the new model request, reference may be made to the method for the model owner obtaining the analytics model according to the model request, which is not described in detail here.

In an example, the method further includes: generating, after obtaining the analytics model, model information and/or model running instance information, the model information includes at least one of: a model version, a model catalog, a model identifier or model association information, and the model running instance includes at least one of: a model running status, a model stopped status, a model running timestamp, a number of model callings, or model accuracy.

In an implementation, the obtaining the analytics model includes at least one of:
determining a desired local model according to the data analytics service type and/or the model identifier, and training the desired local model to obtain the analytics model;
generating a model request according to the data analytics service type and/or the model identifier, sending the model request to a model owner, receiving the analytics model fed back from the model owner;
training the analytics model to obtain the new analytics model; or
sending a new model request to a model owner, and receiving a new analytics model fed back from the model owner.

In an implementation, the model information and/or the model running instance information are sent to a Network Repository Function (NRF). The NEDAF sends the model information to an NRF platform via an X6 interface (see FIG. 3).

The X6 interface is an interface through which the NWDAF is exposed to a 3GPP NF and/or AF and/or OAM, and through such interface, the NWDAF may expose local model information (e.g., model instance management data, model lifecycle management, running status monitoring (such as a model running state or a model stopped state, a number of model callings, accuracy/precision)) to the 3GPP network functions NF and/or AF and/or OAM or the like. The X6 interface may have a subscription/notification or request/response action mechanism.

In an example, the method further includes: generating a data result request and sending the data result request to a model owner; where the data result request includes at least one of: an analytics result receiver address, a model type identifier, a model identifier, the analytics data, or the analytics result policy; and receiving a data analytics result fed back from the model owner, where the data analytics result is determined by the model owner according to the data result request.

Figure 5:
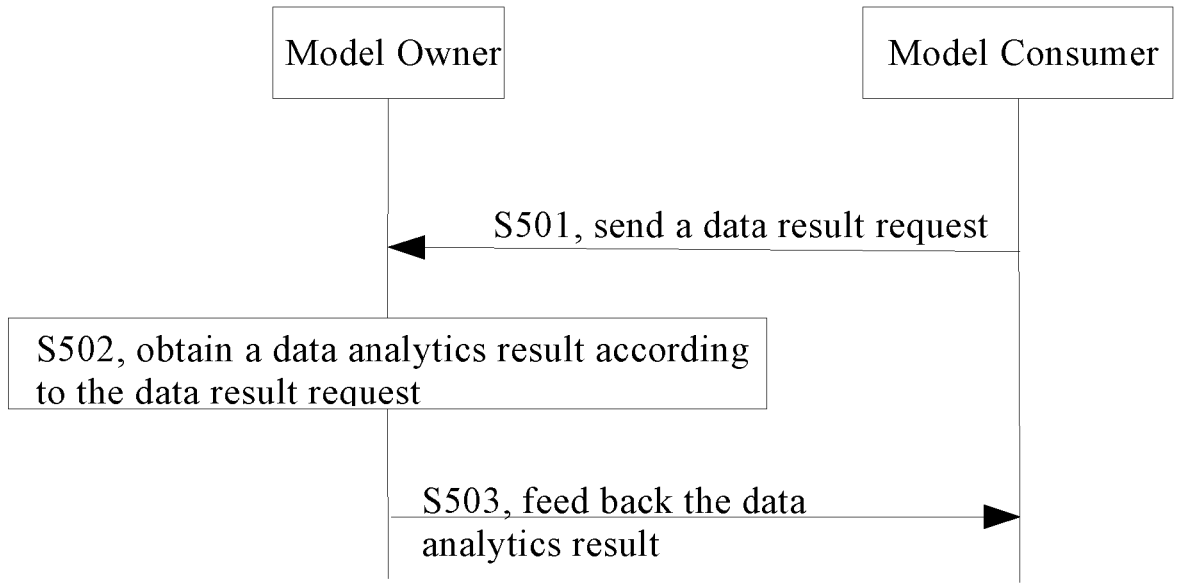
FIG. 5 is a flowchart of a data result request method provided in the present application.

In an example, FIG. 5 is a flowchart of a data result request method provided in the present application. As shown in FIG. 5, the model owner represents a logical function having a model, may further include capabilities including model training, model generation, model management, historical data for model training (e.g., a big data platform), and the model owner may also be indicated as an AI platform or an NWDAF having a model. The model consumer represents a network function expecting to obtain a model, which may be a function such as 3GPP network functions NF and/or AF and/or OAM, or other functions, or may be an NWDAF without any model. In an implementation, the model consumer is an NWDAF without any model. The model consumer sends a model request to the model owner to acquire the analytics model fed back from the model owner.

As shown in FIG. 5, the data result request method provided in the present application includes S501, S502 and S303.

At S501, generating a data result request and sending the data result request to a model owner, the data result request includes at least one of: an analytics result receiver address, a model type identifier, a model identifier, the analytics data, or the analytics result policy.

A model consumer sends a data result request carrying at least one of the parameters listed in table 2 to the model owner. Table 2 is a table of parameters carried in the data result request provided in the present application.

TABLE 2

| Parameter(s) | Description |
| --- | --- |
| Analytics result receiver address | An address for receiving the analytics result |
| Model type identifier | An identifier of the desired model type |
| Model identifier | An identifier of the desired model |
| Analytics data | Data provided to a model owner for model training or analytics, such as analytics data and/or analytics results thereof |
| Analytics result policy requirements | Requirements to be satisfied by the model inference and analytics results, e.g., accuracy, time, or the like of the analytics results |

The model consumer sends a data result request to the model owner via an interface X4 (see FIG. 3).

At S502, obtaining, by the model owner, a data analytics result according to the data result request.

The model owner obtains the data analytics result according to the data result request by at least one of the following modes.

A first mode, determining, by the model owner, an analytics model according to the model type identifier and/or the model identifier, and running the analytics model to analyze the analytics data to obtain the data analytics result; or A second mode, determining, by the model owner, an analytics model according to the model type identifier and/or the model identifier, and training, by the model owner, the analytics model by using the analytics data to obtain a new analytics model; and running the new analytics model to analyze the analytics data to obtain a new data analytics result, judging whether the new data analytics result satisfies an analytics result policy, and returning, in response to that the new data analytics result fails to satisfy the analytics result policy, to execute the operation of training the analytics model by using the analytics data to obtain a new analytics model, until the data analytics result satisfies the analytics result policy.

On the basis of the first mode, if the data analytics result fails to satisfy the analytics result policy, the analytics model is trained by using the analytics data to obtain a new analytics model, the new analytics model is run to analyze the analytics data to obtain a new data analytics result, which is then compared with the analytics result policy, if the new data analytics result fails to satisfy the analytics result policy, the operation of training the analytics model by using the analytics data to obtain a new analytics model is repeated, until the data analytics result satisfies the analytics result policy.

A third mode, acquiring, by the model owner, an analytics model of a third-party model owner according to the model type identifier and/or the model identifier, and running the analytics model to analyze the analytics data to obtain the data analytics result.

At S503, feeding, by the model owner, the data analytics result back to an analytics result receiver.

The model owner feeds the data analytics result back to an analytics result receiver, where the analytics result receiver is determined by the analytics result receiver address.

In an example, the method further includes: receiving NWDAF configuration information; where the configuration information includes at least one of: a model owner address, or a model auxiliary parameter; and configuring a target model according to the NWDAF configuration information.

The configuring the target model according to the NWDAF configuration information includes at least one of:
  training according to the model auxiliary parameter to
    obtain the target model; or
  generating a model request and sending the model request
    to a model owner, and receiving a target model fed back
    from the model owner, the target model is determined
    by the model owner according to the model request.

On the basis of the above implementations, when receiving a request for acquiring the model information from a third party, such as another 3GPP network function, the NWDAF may send a notification message or a response message containing target model information or updated model information of the NWDAF to the third party.

The target model is a local model stored or deployed within the NWDAF.

Figure 6:
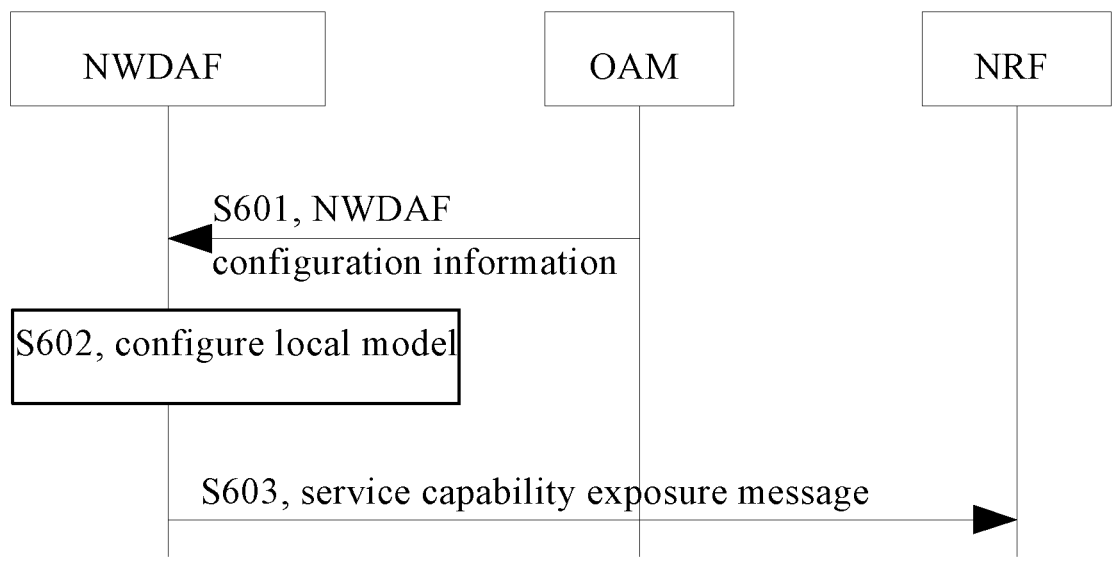
FIG. 6 is a flowchart of a method for configuring a target model provided in the present application.

FIG. 6 is a flowchart of a method for configuring a target model provided in the present application. As shown in FIG. 6, the method for configuring a target model provided in the present application includes S601, S602, and S603.

At S601, receiving, by an NWDAF, configuration information sent from an OAM.

The OAM sends the configuration information carrying at least one of the parameters listed in table 3 to the NWDAF. Table 3 is a table of parameters of configuration information provided in the present application.

TABLE 3

| Parameter(s) | Description |
| --- | --- |
| Model owner address | An address for the NWDAF acquiring a model |
| Indication of capabilities to be supported by NWDAF | Logical functions to be supported by the NWDAF, e.g., Service: such as service experience analysis, load balance analysis, or the like<br>Training: indicating that model training is supported<br>Model running: indicating that running model inference is supported<br>Model management: capability of managing local models;<br>Model exposure: indicating a capability of exposing local models to a model consumer |
| Model files | AI model files |
| Model selection auxiliary parameters | Parameters for model selection, such as model inference accuracy, or the like |

At S602, configuring, by the NWDAF, the target model according to the configuration information.

The configuring, by the NWDAF, the target model according to the configuration information includes at least one at least of:

training, by the NWDAF, the desired model through target model training;

deploying a model of the model files; or sending a model request to a model owner designated by the model owner address.

The method for the NWDAF obtaining the model according to the model request is the same as the method for the model consumer obtaining the analytics model according to the model request described above, and for the specific implementation process of the method for the NWDAF obtaining the model according to the model request, reference may be made to the method for the model consumer obtaining the analytics model according to the model request, which is not described in detail here.

At S603, sending, by the NWDAF, a service capability exposure message to an NRF.

The NWDAF sends the service capability exposure message carrying a service capability folder of the NWDAF to the NRF, the service capability folder contains information about the models supported.

In an example, the method further includes: receiving a model query request, where the model query request is configured to query model information and/or model running instance information, and the model query request includes at least one of: a query result receiver, or a query screening condition; and the query screening condition includes at least one of: a query object, a query time range, or query contents; and sending a model query result to the query result receiver according to the model query request.

Figure 7:
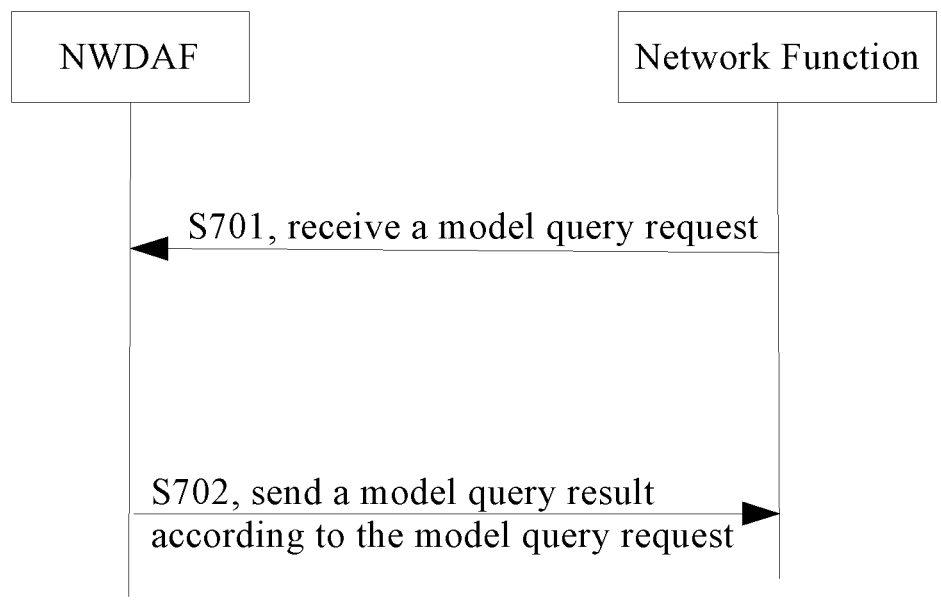
FIG. 7 is a flowchart of a method for querying model information or model running instance information provided in the present application.

FIG. 7 is a flowchart of a method for querying model information or model running instance information provided in the present application. As shown in FIG. 7, the model query request method provided in the present application includes S701 and S702.

At S701, receiving, by an NWDAF, a model information query request and/or a model running instance information query request sent from a network function.

The X6 interface is an interface through which the NWDAF is exposed to 3GPP network functions NF and/or AF and/or OAM, and through such interface, the NWDAF may expose local model information or model running instance information to the 3GPP network functions NF and/or AF and/or OAM or the like. The X6 interface may have a subscription/notification or request/response action mechanism.

A network function (e.g., 3GPP network functions NF and/or AF and/or OAM) sends a query request to the NWDAF to query model information and/or model running instance information, the query request includes at least one of: a query result receiver, or a query screening condition; and the query screening condition includes at least one of: a query object (e.g., a model type or a model identifier), a query time range, or query contents.

At S702, sending, by the NWDAF, a model query result to the query result receiver according to the model query request.

The NWDAF queries the desired model information and/or model running instance information locally according to the query screening condition; the model information includes at least one of: an AI model catalog, an AI model file, or AI model related parameter information (such as model parameter input/output methods, or the like); and the model running instance information includes at least one of the following parameters: model lifecycle management, running status monitoring (such as a model running state or a model stopped state, a number of model callings, accuracy/precision), or the like.

Figure 8:
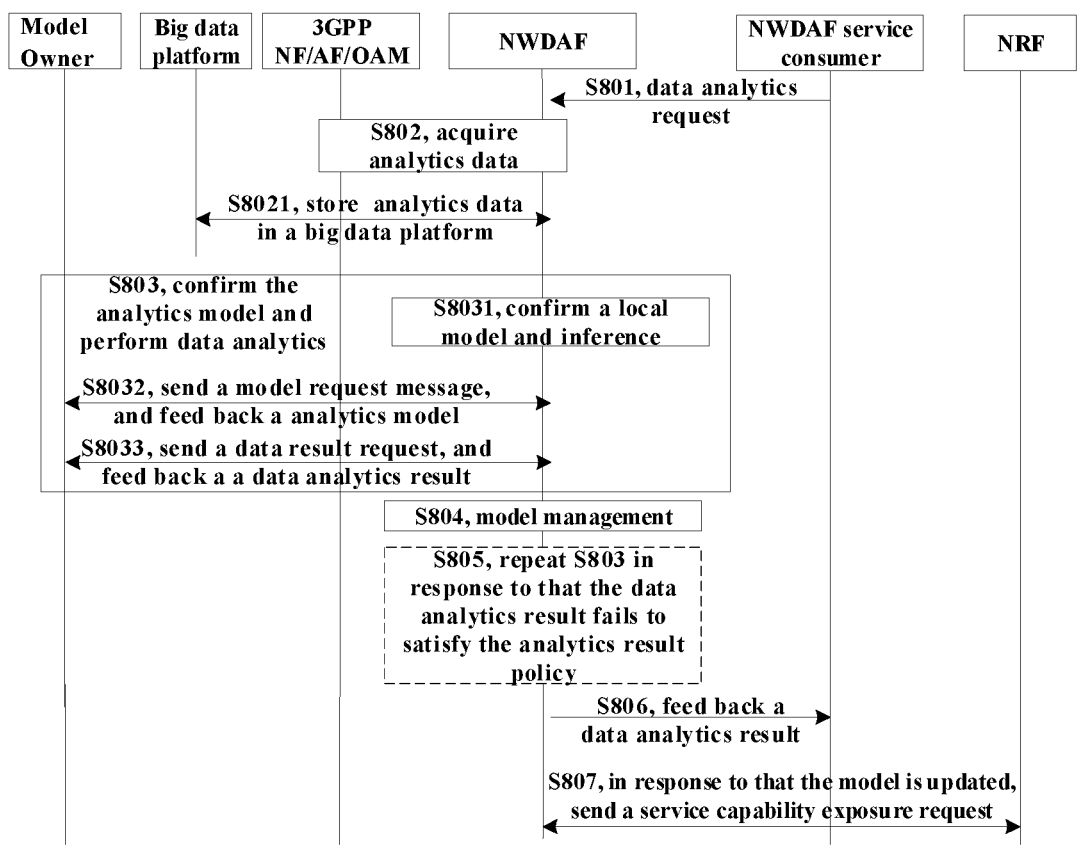
FIG. 8 is a flowchart of a data analytics method provided in the present application.

On the basis of the above implementations, the present application provides an instance. FIG. 8 is a flowchart of a data analytics method provided in the present application. As shown in FIG. 8, the data analytics method provided in the present application includes S801, S802, S803, S804, S805, S806, and S807.

At S801, sending a data analytics request from an NWDAF service consumer to the NWDAF.

The data analytics request includes at least one of: a data analytics service type, a model identifier, or an analytics result policy; the analytics result policy is a requirement to be satisfied by the model analytics result, and includes at least one of: analytics result accuracy, or a return time length of analytics results. The data analytics service type is a data analytics service capability identifier defined by the NWDAF, and includes at least one of: service experience, or a load level, and the model identifier is identifier information of the model to be used in a data analytics service.

At S802, acquiring, by the NWDAF, analytics data from network functions NF and/or AF and/or OAM of a 3rd Generation Partnership Project (3GPP) network according to the data analytics service type.

In an implementation, at S8021, sending the analytics data to a big data platform for storage.

At S803, confirming the analytics model and performing data analytics.

The NWDAF determines the desired analytics model, and runs the analytics model to analyze the acquired analytics data to obtain an analytics result.

The confirming the analytics model may include at least one of S8031 or S8032.

At S8031, confirming a local model.

The confirming the local model includes: determining a desired model and/or model type according to the data analytics service type and/or the model identifier, and determining a local model which is the same as the desired model and/or has a type the same as the desired model type, as the analytics model.

At S8032, generating a model request according to the data analytics service type and/or the model identifier, sending the model request to a model owner, and receiving an analytics model fed back from the model owner, the model owner is an AI platform or a 3GPP network function having a model; and the analytics model is determined by the model owner according to the model request.

The performing data analytics further includes: S8033, sending, by the NWDAF, a data result request to a model owner, and feeding back a data analytics result from the model owner.

Regarding the method for the model owner obtaining the data analytics result according to the data result request, reference may be made to descriptions above, which is not described repeatedly here.

At S804, updating, by the NWDAF, the stored model information (e.g., a model version, etc.) and/or model running instance information (e.g., model running status, running times, etc.).

At S805, updating the model in response to that the data analytics result fails to satisfy the analytics result policy, and returning to S803.

At S806, returning a data analytics result to the NWDAF service consumer according to the analytics result policy.

At S807, sending the model information and/or the model running instance information to the NRF.

The model information includes at least one of: a model version, a model catalog, a model identifier or model association information, and the model running instance includes at least one of: a model running status, a model stopped status, a model running timestamp, a number of model callings, or model accuracy.

Figure 9:
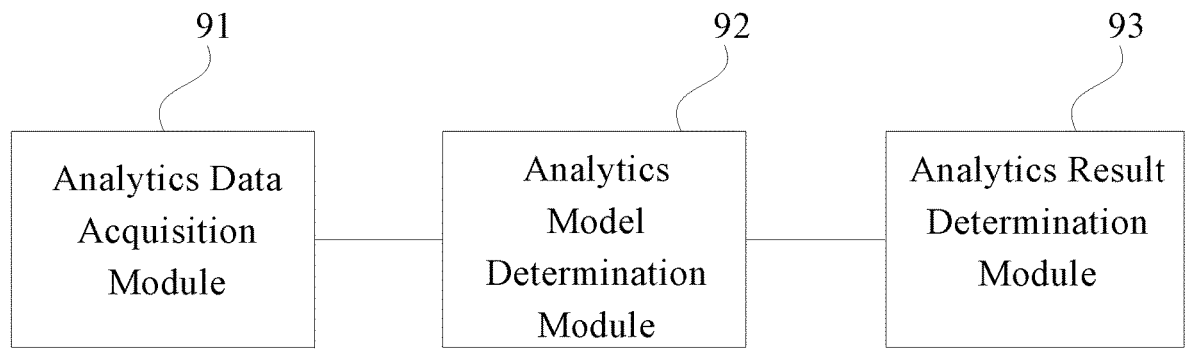
FIG. 9 is a schematic structural diagram of a data analytics apparatus provided in the present application.

An embodiment of the present application further provides a data analytics apparatus. FIG. 9 is a schematic structural diagram of a data analytics apparatus provided in the present application. The apparatus may be applied to a scenario of selecting a desired AI model in a 3GPP network for data analytics. The data analytics apparatus may be implemented by software and/or hardware. As shown in FIG. 9, the data analytics apparatus includes:

an analytics data acquisition module 91 configured to determine analytics data according to a data analytics request, where the data analytics request includes a first data analytics request or a second data analytics request;

an analytics model determination module 92 configured to determine an analytics model according to the data analytics request; and an analytics result determination module 93 configured to obtain a data analytics result according to the analytics data and the analytics model.

The data analytics apparatus provided in the embodiment is used for implementing the data analytics method provided in the embodiment of the present application, and has similar principles and technical effects as the data analytics method provided in the embodiment of the present application, which are not described in detail herein.

In an exemplary implementation, the first data analytics request includes at least one of: a data analytics service type, a model identifier, or an analytics result policy, and the second data analytics request includes at least one of: a data analytics service type, data to be analyzed, a model identifier, or an analytics result policy.

In an exemplary implementation, the analytics data acquisition module 91 is configured to determine the analytics data by at least one of:

acquiring, according to the data analytics service type in the first data analytics request, the analytics data from a 3GPP network; or determining the data to be analyzed carried in the second data analytics request as the analytics data.

In an exemplary implementation, the device further includes: a sending module configured to send the analytics data to a big data platform for storage.

In an exemplary implementation, the analytics model determination module 92 is configured to determine the analytics model by one of:

determining a desired model and/or model type according to the data analytics service type and/or the model identifier, and determining a local model, which is the same as the desired model and/or has a type the same as the desired model type, as the analytics model;

determining a desired local model according to the data analytics service type and/or the model identifier, and training the desired local model to obtain the analytics model; or generating a model request according to the data analytics service type and/or the model identifier, sending the model request to a model owner, and receiving an analytics model fed back from the model owner, the model owner is an AI platform or a 3GPP network function having a model; and the analytics model is determined by the model owner according to the model request.

In an exemplary implementation, the analytics result determination module 93 is configured to run the analytics model to analyze the analytics data to obtain the data analytics result.

In an exemplary implementation, the analytics model determination module 92 is further configured to determine a new analytics model in response to that the data analytics result fails to satisfy an analytics result policy; and run the new analytics model to analyze the analytics data to obtain a new data analytics result.

In an exemplary implementation, the analytics model determination module 92 is configured to determine the new analytics model by one of:

training the analytics model to obtain the new analytics model; or sending a new model request to a model owner, and receiving a new analytics model fed back from the model owner.

In an exemplary implementation, the model request includes at least one of: a model receiver address, a model type identifier, a model identifier, training data, a model screening condition, model data association information, or a model feedback policy.

In an exemplary implementation, the apparatus further includes: an information generation module configured to generate model information and/or model running instance information after obtaining the analytics model, the model information includes at least one of: a model version, a model catalog, a model identifier or model association information, and the model running instance includes at least one of: a model running status, a model running timestamp, a number of model callings, or model accuracy.

In an exemplary implementation, the sending module is further configured to send the model information and/or the model running instance information to an NRF.

In an exemplary implementation, the model owner obtains the analytics model according to the model request by at least one of:

determining, by the model owner, a model satisfying the model type identifier and/or the model identifier and/or the model screening condition as the analytics model;

determining, by the model owner, a model satisfying the model type identifier and/or the model identifier and/or the model screening condition as the desired model, and training, by the model owner, the desired model according to the training data and/or the model data association information to obtain the analytics model; or forwarding, by the model owner, the model request to a third-party model owner, and receiving an analytics model from the third-party model owner.

In an exemplary implementation, the model owner feeds the analytics model back to a model receiver according to the model feedback policy, and the model receiver is determined by the model receiver address.

In an exemplary implementation, the information generation module is further configured to generate a data result request and send the data result request to a model owner; and the data result request includes at least one of: an analytics result receiver address, a model type identifier, a model identifier, the analytics data, or the analytics result policy. The apparatus further includes: a receiving module configured to receive a data analytics result fed back from the model owner. The data analytics result is determined by the model owner according to the data result request.

In an exemplary implementation, the model owner obtains the data analytics result according to the data result request by at least one of:

determining, by the model owner, an analytics model according to the model type identifier and/or the model identifier, and running the analytics model to analyze the analytics data to obtain the data analytics result;

training, by the model owner, an analytics model by using the analytics data to obtain a new analytics model, and running the new analytics model to analyze the analytics data to obtain a new data analytics result, judging whether the new data analytics result satisfies an analytics result policy, and returning, in response to that the new data analytics result fails to satisfy the analytics result policy, to execute the operation of training the analytics model by using the analytics data to obtain a new analytics model, until the data analytics result satisfies the analytics result policy; or acquiring, by the model owner, an analytics model of a third-party model owner according to the model type identifier and/or the model identifier, and running the analytics model to analyze the analytics data to obtain the data analytics result.

In an exemplary implementation, the model owner feeds the data analytics result back to an analytics result receiver, the analytics result receiver is determined by the analytics result receiver address.

In an exemplary implementation, the receiving module is further configured to receive NWDAF configuration information, the configuration information includes at least one of: a model owner address, or a model auxiliary parameter.

A configuration module is configured to configure a target model according to the NWDAF configuration information.

In an exemplary implementation, the configuration module is configured to configure a target model by one of:

training according to the model auxiliary parameter to obtain the target model; or generating a model request and sending the model request to a model owner, and receiving a target model fed back from the model owner, the target model is determined by the model owner according to the model request.

In an exemplary implementation, the receiving module is further configured to receive a model query request, the model query request is configured to query model information and/or model running instance information, the model query request includes at least one of: a query result receiver, or a query screening condition; and the query screening condition includes at least one of: a query object, a query time range, or query contents.

The sending module is further configured to send a model query result to the query result receiver according to the model query request.

Figure 10:
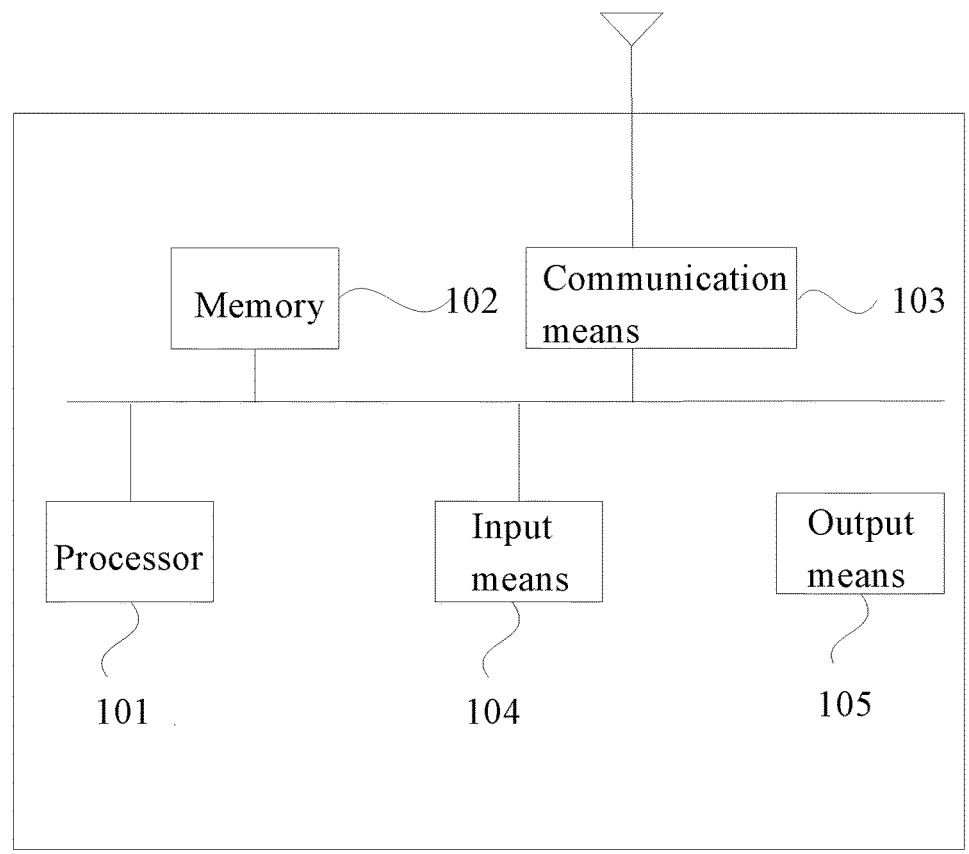
FIG. 10 is a schematic structural diagram of an electronic device provided in the present application.

An embodiment of the present application further provides an electronic device. FIG. 10 is a schematic structural diagram of an electronic device provided in the present application. The electronic device provided in the present application, as shown in FIG. 10, includes one or more processors 101 and a memory 102. One or more processors 101 may be provided in the electronic device, but FIG. 10 illustrates one processor 101 as an example. The memory 102 is configured to store one or more programs which, when executed by the one or more processors 101, cause the one or more processors 101 to implement the data analytics method according to the embodiment of the present application.

The electronic device further includes: a communication means 103, an input means 104, and an output means 105.

The processor 101, the memory 102, the communication means 103, the input means 104, and the output means 105 in the electronic device may be connected via a bus or in other manners, and FIG. 10 illustrates a bus for connecting as an example.

The input means 104 may be configured to receive input numeric or character information and generate key signal inputs related to user settings or function controls of the electronic device. The output means 105 may include a display device such as a display screen.

The communication means 103 may include a receiver and a transmitter. The communication means 103 is configured to perform information transceiving communication under a control of the processor 101.

The memory 102, as a computer-readable storage medium, may be configured to store software programs, computer-executable programs, or modules, such as program instructions/modules corresponding to the data analytics method in the embodiment of present application (e.g., the analytics data acquisition module 91, the analytics model determination module 92, and the analytics result determination module 93 in the data analytics apparatus). The memory 102 may include a program storage area and a data storage area, the program storage area may store an operating system, or an application program for at least one function; and the data storage area may store data created according to the use of the apparatus, or the like. Further, the memory 102 may include a high speed random access memory, or may include a non-volatile memory, such as at least one magnetic disk memory device, flash memory device, or other non-volatile solid state memory devices. In some examples, the memory 102 may include a memory remotely disposed relative to the processor 101, such memory remotely disposed may be connected to the electronic device via a network. Examples of such network include, but are not limited to, the Internet, intranets, local area networks, mobile communication networks, and combinations thereof.

An embodiment of the present application further provides a storage medium having a computer program stored therein, the computer program, when executed by a processor, causes the data analytics method according to the embodiment of the present application to be implemented. The method includes:

determining analytics data according to a data analytics request, where the data analytics request includes a first data analytics request or a second data analytics request; determining an analytics model according to the data analytics request; and inputting the analytics data into the analytics model to obtain a data analytics result.

The above are merely exemplary embodiments of the present application and not intended to limit the scope of the present application.

The term "user terminal" covers any suitable type of wireless user equipment, such as a mobile phone, a portable data processing device, a portable web browser or a vehicle mobile station.

In general, the various embodiments of the present application may be implemented in hardware or dedicated circuits, software, logic or any combination thereof. For example, some aspects may be implemented in hardware, while other aspects may be implemented in firmware or software which may be executed by a controller, microprocessor or other computing device, although the present application is not limited thereto.

Embodiments of the present application may be implemented by a data processor of a mobile device executing computer program instructions, for example in a processor entity, or by hardware, or by a combination of software and hardware. The computer program instructions may be assembler instructions, Instruction Standard Architecture (ISA) instructions, machine instructions, machine-related instructions, microcode, firmware instructions, state setting data, or source code or object code written in any combination of one or more programming languages.

The block diagrams of any logic flows in the figures of this application may represent program operations, or may represent interconnected logic circuits, modules, and functions, or may represent a combination of program operations and logic circuits, modules, and functions. The computer program may be stored in a memory. The memory may be of any type suitable to the local technical environment and may be implemented using any suitable data storage technology, includes, but not limited to, a read-only memory (ROM), a random access memory (RAM), an optical storage device or system (a digital versatile disc (DVD), a compact disc (CD)), etc. The computer-readable medium may include a non-transitory storage medium. The data processor may be of any type suitable to the local technical environment, includes, but not limited to, general purpose computers, dedicated computers, microprocessors, digital signal processors (DSPs), application specific integrated circuits (ASICs), field-programmable gate arrays (FGPAs), and processors based on multi-core processor architecture.

What is claimed is:

1. A data analytics method, comprising:
   determining, by NWDAF, analytics data according to a data analytics request received from a NWDAF service consumer,
   determining an analytics model according to the data analytics request; and
   obtaining a data analytics result according to the analytics data and the analytics model,
   wherein the data analytics request comprises at least two of: a data analytics service type, a model identifier, or an analytics result policy,
   wherein the analytics result policy comprises at least one of: an accuracy of analytics result, or a return time length of analytics result,
   wherein the determining analytics data according to a data analytics request comprises:
   acquiring the analytics data from a 3rd Generation Partnership Project (3GPP) network according to the data analytics service type in the data analytics request;
   wherein determining an analytics model according to the data analytics request; and obtaining a data analytics result according to the analytics data and the analytics model by at least one of:
   determining, by the NWDAF, an analytics model according to at least one of a model type identifier or a model identifier, and running the analytics model to analyze the analytics data and obtain the data analytics result;
   training, by the NWDAF, an analytics model by using the analytics data to obtain a new analytics model; running the new analytics model to analyze the analytics data to obtain a new data analytics result, judging whether the new data analytics result satisfies the analytics result policy, and returning, in response to that the new data analytics result fails to satisfy the analytics result policy, to execute the operation of training the analytics model by using the analytics data to obtain a new analytics model, until the obtained data analytics result satisfies the analytics result policy; and
   acquiring, by the NWDAF, an analytics model of a third-party model owner according to at least one of a model type identifier or a model identifier, and running the analytics model to analyze the analytics data to obtain the data analytics result;
   wherein obtaining a data analytics result according to the analytics data and the analytics model further by:
   feeding, by the NWDAF, the data analytics result back to an analytics result receiver, wherein the analytics result receiver is determined by an analytics result receiver address.

2. The method according to claim 1, wherein the determining an analytics model according to the data analytics request comprises at least one of:
   determining at least one of a desired model or a desired model type according to at least one of the data analytics service type or the model identifier, and determining a local model, which is the same as the desired model or has a type the same as the desired model type, as the analytics model;
   determining a desired local model according to at least one of the data analytics service type or the model identifier, and training the desired local model to obtain the analytics model; or
   generating a model request according to at least one of the data analytics service type or the model identifier, sending the model request to a model owner, and receiving an analytics model fed back from the model owner, wherein the model owner is an artificial intelligence (AI) platform or a 3GPP network function having a model; and the analytics model is determined by the model owner according to the model request.

3. The method according to claim 1, wherein, after obtaining the data analytics result according to the analytics data and the analytics model, the method further comprises:
  determining a new analytics model in response to that the data analytics result fails to satisfy an analytics result policy.

4. The method according to claim 3, wherein the determining a new analytics model comprises one of:
  training the analytics model to obtain a new analytics model; or
  sending a new model request to a model owner, and receiving a new analytics model fed back from the model owner.

5. The method according to claim 2, wherein the model request comprises at least one of: a model receiver address, a model type identifier, a model identifier, training data, a model screening condition, model data association information, or a model feedback policy.

6. The method according to claim 2, wherein, after obtaining the analytics model, the method further comprises:
  generating at least one of model information or model running instance information, wherein the model information comprises at least one of: a model version, a model catalog, a model identifier or model association information, and the model running instance comprises at least one of: a model running status, a model running timestamp, a number of model callings, or model accuracy.

7. The method according to claim 5, wherein the model owner obtains the analytics model according to the model request by at least one of:
  determining, by the model owner, a model satisfying at least one of the model type identifier, the model identifier, or the model screening condition as the analytics model;
  determining, by the model owner, a model satisfying at least one of the model type identifier, the model identifier, or the model screening condition as the desired model, training, by the model owner, the desired model according to at least one of the training data or the model data association information to obtain the analytics model; or
  forwarding, by the model owner, the model request to a third-party model owner, and receiving an analytics model from the third-party model owner.

8. The method according to claim 7, wherein, the model owner obtains the analytics model according to the model request further by:
  feeding, by the model owner, the analytics model back to a model receiver according to the model feedback policy, wherein the model receiver is determined by the model receiver address.

9. The method according to claim 1, wherein, after determining analytics data according to the data analytics request, the method further comprises:
  generating a data result request and sending the data result request to a model owner; the data result request comprising at least one of: an analytics result receiver address, a model type identifier, a model identifier, the analytics data, or the analytics result policy; or
  receiving a data analytics result fed back from the model owner, wherein the data analytics result is determined by the model owner according to the data result request.

10. The method according to claim 1, further comprising:
  receiving Network Data Analytics Function (NWDAF) configuration information; wherein the NWDAF configuration information comprises at least one of: a model owner address, or a model auxiliary parameter; and
  configuring a target model according to the NWDAF configuration information.

11. The method according to claim 10, wherein the configuring a target model according to the NWDAF configuration information comprises at least one of:
  training according to the model auxiliary parameter to obtain the target model; or
  generating a model request and sending the model request to a model owner, and receiving a target model fed back from the model owner, wherein the target model is determined by the model owner according to the model request.

12. The method according to claim 1, further comprising:
  receiving a model query request, wherein the model query request is configured to query at least one of model information or model running instance information, and wherein the model query request comprises at least one of: a query result receiver, or a query screening condition; and the query screening condition comprises at least one of: a query object, a query time range, or query contents; and
  sending a model query result to the query result receiver according to the model query request.

13. A data analytics apparatus, comprising:
  an analytics data acquisition module configured to determine, by NWDAF, analytics data according to a data analytics request received from a NWDAF service consumer;
  an analytics model determination module configured to determine an analytics model according to the data analytics request; and
  an analytics result determination module configured to obtain a data analytics result according to the analytics data and the analytics model,
  wherein the data analytics request comprises at least two of: a data analytics service type, a model identifier, or an analytics result policy,
  wherein the analytics result policy comprises at least one of: an accuracy of analytics result, or a return time length of analytics result,
  wherein the determining analytics data according to a data analytics request comprises:
  acquiring the analytics data from a 3rd Generation Partnership Project (3GPP) network according to the data analytics service type in the data analytics request;
  wherein determining an analytics model according to the data analytics request; and obtaining a data analytics result according to the analytics data and the analytics model by at least one of:
  determining, by the NWDAF, an analytics model according to at least one of a model type identifier or a model identifier, and running the analytics model to analyze the analytics data and obtain the data analytics result;
  training, by the NWDAF, an analytics model by using the analytics data to obtain a new analytics model; running the new analytics model to analyze the analytics data to obtain a new data analytics result, judging whether the new data analytics result satisfies the analytics result policy, and returning, in response to that the new data analytics result fails to satisfy the analytics result policy, to execute the operation of training the analytics model by using the analytics data to obtain a new analytics model, until the obtained data analytics result satisfies the analytics result policy; and acquiring, by the NWDAF, an analytics model of a third-party model owner according to at least one of a model type identifier or a model identifier, and running the analytics model to analyze the analytics data to obtain the data analytics result;

wherein obtaining a data analytics result according to the analytics data and the analytics model further by:

feeding, by the NWDAF, the data analytics result back to an analytics result receiver, wherein the analytics result receiver is determined by an analytics result receiver address.

14. An electronic device, comprising:
at least one processor;
a memory configured to store at least one program; wherein
the at least one program, when executed by the at least one processor, causes the at least one processor to implement the data analytics method according to claim 1.

15. A storage medium storing a computer program therein, the computer program, when executed by a processor, causes the data analytics method according to claim 1 to be implemented.

16. The method according to claim 3, wherein, after obtaining the analytics model, the method further comprises:

generating at least one of model information or model running instance information, wherein the model information comprises at least one of: a model version, a model catalog, a model identifier or model association information, and the model running instance comprises at least one of: a model running status, a model running timestamp, a number of model callings, or model accuracy.

17. The method according to claim 3, the method further comprises:

running the new analytics model to analyze the analytics data to obtain a new data analytics result.

18. The method according to claim 1, wherein the data analytics service type comprises at least one of: service experience, or a load level.

* * * * *

UNITED STATES PATENT AND TRADEMARK OFFICE
CERTIFICATE OF CORRECTION

PATENT NO. : 12,224,914 B2
APPLICATION NO. : 17/642157
DATED : February 11, 2025
INVENTOR(S) : Yingjie Hong et al.

It is certified that error appears in the above-identified patent and that said Letters Patent is hereby corrected as shown below:

In the Claims

In Claim 1, Column 24, Lines 17-20, reading -wherein determining an analytics model according to the data analytics request; and obtaining a data analytics result according to the analytics data and the analytics model by at least one of:- should read --wherein determining the analytics model according to the data analytics request and obtaining the data analytics result according to the analytics data and the analytics model by at least one of:--

In Claim 13, Column 26, Lines 49-52, reading -wherein determining an analytics model according to the data analytics request; and obtaining a data analytics result according to the analytics data and the analytics model by at least one of:- should read --wherein determining the analytics model according to the data analytics request and obtaining the data analytics result according to the analytics data and the analytics model by at least one of:--

Signed and Sealed this
Twenty-ninth Day of April, 2025

Coke Morgan Stewart
*Acting Director of the United States Patent and Trademark Office*